United States Patent
Okumura (10) Patent No.: US 7,948,691 B2
(45) Date of Patent: May 24, 2011

(54) OPTICAL SYSTEM AND OPTICAL DEVICE INCLUDING THE SAME

(75) Inventor: Tetsuichirou Okumura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/878,404

(22) Filed: Sep. 9, 2010

(65) Prior Publication Data

US 2011/0080654 A1 Apr. 7, 2011

(30) Foreign Application Priority Data

Oct. 5, 2009 (JP) ................. 2009-231315

(51) Int. Cl.
*G02B 9/00* (2006.01)
*G02B 13/02* (2006.01)

(52) U.S. Cl. ............... 359/754; 359/745

(58) Field of Classification Search .......... 359/745–748, 359/754
See application file for complete search history.

(56) References Cited

U.S. PATENT DOCUMENTS

| 6,115,188 | A | 9/2000 | Nishio et al. |
| 6,239,919 | B1 | 5/2001 | Sato |
| 7,253,973 | B2 * | 8/2007 | Yasui ............... 359/754 |
| 7,538,957 | B2 | 5/2009 | Endo |

FOREIGN PATENT DOCUMENTS

JP 2008-145584 A 6/2008

OTHER PUBLICATIONS

Extended European Search report issued in corresponding European Patent Application No. 10178308.2 dated Jan. 20, 2011.
Annette Kniffler "Ratgeber: Glas als Werkstoff" XP002612260 Colorfoto, Feb. 15 2008.URL:http://www.colorfoto.de/ratgeber/glasals-werkstoff-372481.html Cited in Extended European Search report issued in corresponding European Patent Application No. 10178308.2 dated Jan. 20, 2011.
"PgF Diagram" Schott Catalogue Jan. 1, 1981. Schott, Mainz, XP002612262. Cited in Extended European Search report issued in corresponding European Patent Application No. 10178308.2 dated Jan. 20, 2011.
Schott "Abbe Diagram" XP002612261, Aug. 1, 2010. URL:http://www.schott.com/advanced_optics/german/download/301576_diagramm-poster_d.pdf> Cited in Extended European Search report issued in corresponding European Patent Application No. 10178308.2 dated Jan. 20, 2011.
Sugita, Shigenobu. "Optical System and Optical Apparatus Having the Same," Specification and Drawings of related copending U.S. Appl. No. 12/904,727, filed Oct. 14, 2010, pp. 1-34.
Extended European Search report issued in corresponding European Patent Application No. 10177870.2 dated Jan. 20, 2011,which corresponds to related co-pending U.S. Appl. No. 12/904,727.

* cited by examiner

*Primary Examiner* — Scott J Sugarman
(74) *Attorney, Agent, or Firm* — Rossi, Kimms & McDowell LLP

(57) ABSTRACT

Provided is a zoom lens system including: in order from an object side to an image side, a first lens unit having a positive refractive power; an aperture stop; and a second lens unit, in which the first lens unit includes a first-a lens unit having a positive refractive power and a first-b lens unit having a negative refractive power which moves along an optical axis in focusing, the first-b lens unit includes at least one negative lens and at least one positive lens, and the following conditional expression is satisfied: $0.020 < \theta gF1 - 0.6438 + 0.001682 \times vd1 < 0.100$, where $\theta gF1$ denotes a partial dispersion ratio of a material of the positive lens, and $vd1$ denotes Abbe number of the positive lens.

8 Claims, 7 Drawing Sheets

OPTICAL SYSTEM AND OPTICAL DEVICE INCLUDING THE SAME

BACKGROUND OF THE INVENTION

1. Field of the Invention

The present invention relates to an optical system and an optical device including the same, and is suitably applied to an optical device such as, for example, a silver halide camera, a digital still camera, or a digital video camera.

2. Description of the Related Art

An optical system for a use in an image taking apparatus such as a digital camera or a video camera is required to have a short total lens length (length from a first lens surface closest to an object side to an image surface), and to be small and lightweight as an entire optical system. In particular, an optical system with a large diameter is likely to have a long total lens length and a large weight, and hence it is strongly required to reduce the size and the weight. In general, when an optical system is reduced in size and weight, various aberrations, in particular, chromatic aberrations such as a longitudinal chromatic aberration or a lateral chromatic aberration is increased, with the result that optical performance is likely to be deteriorated. In particular, in a telephoto type optical system (telephoto lens) which is reduced in total lens length or weight, chromatic aberration is increased as the focal length becomes long.

As a method of reducing chromatic aberration in an optical system, there is generally well known a method in which an anomalous partial dispersion material is used as an optical material (see U.S. Pat. No. 6,115,188).

In the telephoto type optical system, chromatic aberration is corrected in a front lens unit at which passing positions of a paraxial on-axis light ray and a paraxial chief ray are relatively higher than that of the optical axis. Specifically, a positive refractive power lens made of a low dispersion optical material such as fluorite having anomalous partial dispersion (optical member having a large Abbe number) and a negative refractive power lens made of an optical material having high dispersion are used for correcting chromatic aberration. Here, the paraxial on-axis light ray refers to a paraxial light ray that enters in parallel to the optical axis of the optical system when a focal length of the total optical system is normalized to be one and the light ray has a height of one from the optical axis. Meanwhile, the paraxial chief ray refers to a paraxial light ray that passes through an intersection of an entrance pupil of the optical system and the optical axis, among light rays entering at −45 degrees with respect to the optical axis, when a focal length of the total optical system is normalized to be one.

For example, in U.S. Pat. No. 6,115,188 discloses a telephoto type optical system in which a low dispersion optical material such as fluorite having anomalous partial dispersion is used, to thereby reduce chromatic aberration. In the telephoto type optical system using fluorite as an optical material, it is easy to correct chromatic aberration in the case where the total lens length is set relatively large. However, when trying to reduce the total lens length, chromatic aberration increases.

The reason is as follows. That is, chromatic aberration generated in the front lens system is reduced by merely utilizing low dispersion and anomalous partial dispersion of the material such as fluorite. In order to correct chromatic aberration of the optical system that is deteriorated due to reduction of the total lens length, it is necessary to largely change a refractive power of a lens, for example, in a lens system using a low dispersion glass such as fluorite having a large Abbe number. Therefore, it is difficult to correct appropriately all aberrations including spherical aberration, coma aberration, and astigmatism, which are generated due to increases of chromatic aberration and a refractive power. In the optical system disclosed in U.S. Pat. No. 6,115,188, a low dispersion material having a high anomalous partial dispersion property is used at a position having a large front lens diameter so that various aberrations such as chromatic aberration can be appropriately corrected.

SUMMARY OF THE INVENTION

It is an object of the present invention to provide a compact and lightweight optical system and an optical device using the same, which are capable of appropriately correcting various aberrations such as chromatic aberration.

An optical system according to the present invention includes: in order from an object side to an image side; a first lens unit having a positive refractive power; an aperture stop; and a second lens unit, in which the first lens unit includes a first-a lens unit having a positive refractive power and a first-b lens unit having a negative refractive power which moves along an optical axis in focusing, the first-b lens unit includes at least one negative lens and at least one positive lens $1bp$, the following conditional expression is satisfied:

$$0.020 < \theta gF1 - 0.6438 + 0.001682 \times vd1 < 0.100,$$

where $\theta gF1$ denotes a partial dispersion ratio of a material of the positive lens $1bp$, and $vd1$ denotes Abbe number of the material.

Further features of the present invention will become apparent from the following description of exemplary embodiments with reference to the attached drawings.

DESCRIPTION OF THE EMBODIMENTS

An optical system of the present invention consists of, in order from the object side to the image side, a first lens unit L1 having a positive refractive power, an aperture stop SP, and a second lens unit L2. Further, the first lens unit L1 in Numerical Embodiments 1, 2, 3, 5, and 6, which are described later, consists of a first-a lens unit L1a having a positive refractive power and a first-b lens unit L1b having a negative refractive power for focusing. In addition, the first lens unit L1 of Numerical Embodiment 4 that is described later consists of the first-a lens unit L1a having a positive refractive power, the first-b lens unit L1b having a negative refractive power for focusing, and the first-c lens unit L1c having a positive refractive power.

The optical system of each embodiment is used for an image taking apparatus such as a digital camera, a video camera, or a silver halide film camera, or an observing apparatus such as a telescope or a binoculars, or an optical device such as a projector.

In general, in the telephoto type optical system such as a telephoto lens, chromatic aberration is corrected in a front lens unit at which passing positions a paraxial on-axis light ray and a paraxial chief ray are relatively higher than that of the optical axis. Specifically, a positive refractive power lens made of a low dispersion optical material such as fluorite having anomalous partial dispersion and a negative refractive power lens made of an optical material having high dispersion are used for correcting chromatic aberration.

The optical system of the present invention performs focusing by moving, along the optical axis, the first-b lens unit L1b having a negative refractive power disposed on the object side with respect to the aperture stop SP. In order to suppress chromatic aberration fluctuation in the focusing, it is necessary to suppress occurrence of chromatic aberration in each lens unit. In general, in order to suppress primary chromatic aberration, it is effective to use a low dispersion material for a positive lens and to use a high dispersion material for a negative lens, in a lens unit having a positive refractive power. On the contrary, it is effective to use a low dispersion material for a negative lens and use a high dispersion material for a positive lens in a lens unit having a negative refractive power. In addition, in order to suppress secondary chromatic aberration, it is effective to use a glass material having a high anomalous partial dispersion property.

In U.S. Pat. No. 6,115,188 described above, a low dispersion material having high anomalous partial dispersion property is used for a positive lens having a large front lens effective diameter so as to alleviate various aberrations such as chromatic aberration. In the optical system of the present invention, a high dispersion material having a high anomalous partial dispersion property is used for a positive lens of the first-b lens unit L1b having a negative refractive power disposed on the object side with respect to the aperture stop SP, so that a share of correcting chromatic aberration of a positive lens having an anomalous dispersion property in the first-a lens unit L1a having a positive refractive power disposed on the object side with respect to the aperture stop SP is reduced. With this configuration, a lightweight or compact optical system can be achieved.

Figure 1:
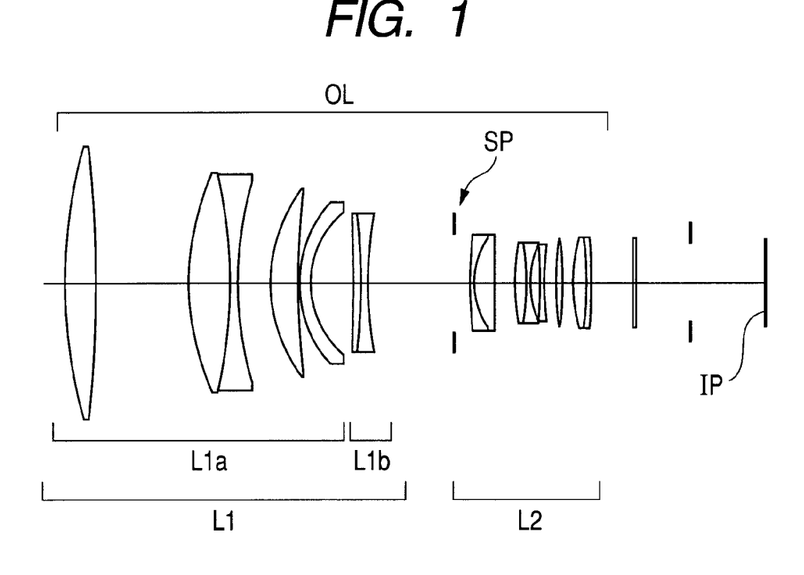
FIG. 1 is a lens cross section of an optical system according to Numerical Embodiment 1 of the present invention
Figure 2:
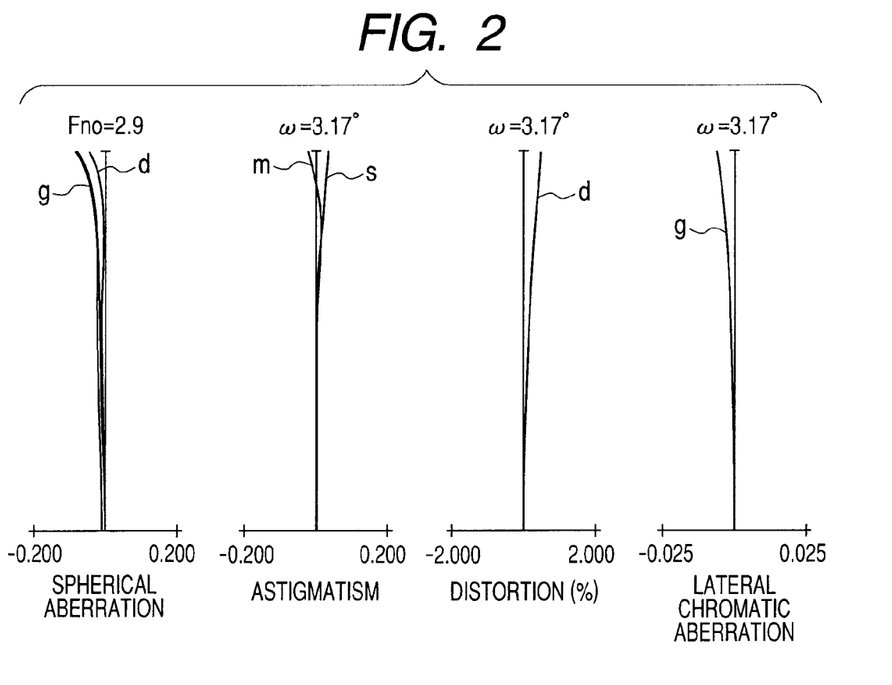
FIG. 2 is a diagram illustrating various aberrations when focused at infinity according to Numerical Embodiment 1 of the present invention.
Figure 3:
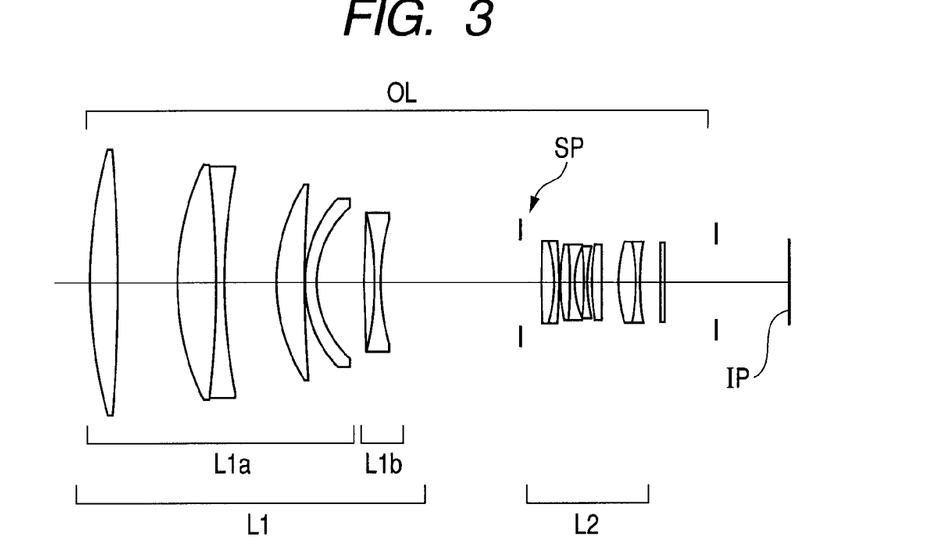
FIG. 3 is a lens cross section of an optical system according to Numerical Embodiment 2 of the present invention.
Figure 4:
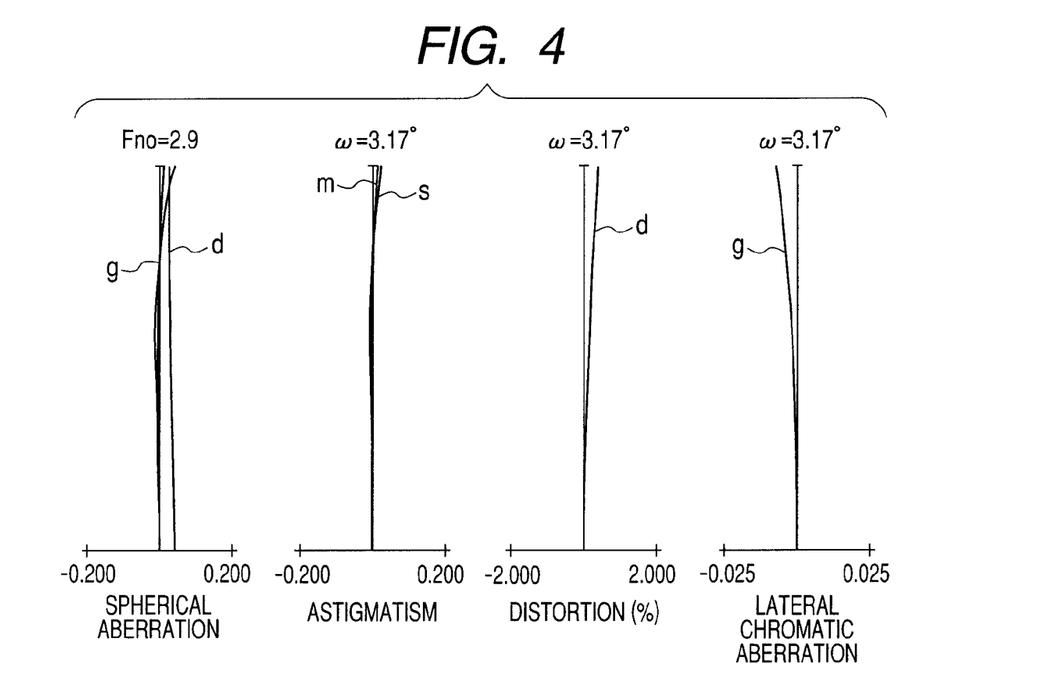
FIG. 4 is a diagram illustrating various aberrations when focused at infinity according to Numerical Embodiment 2 of the present invention.
Figure 5:
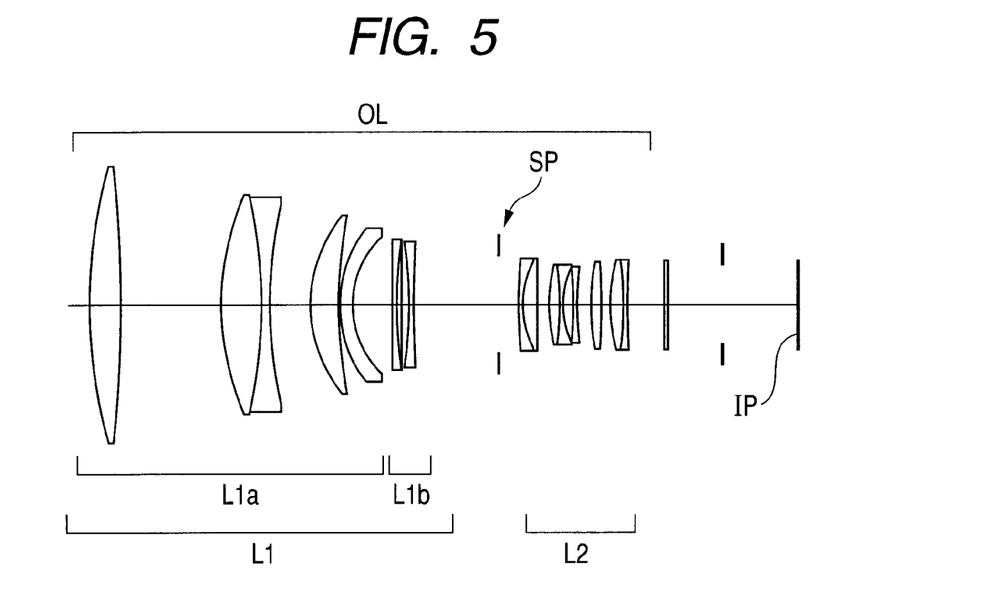
FIG. 5 is a lens cross section of an optical system according to Numerical Embodiment 3 of the present invention.
Figure 6:
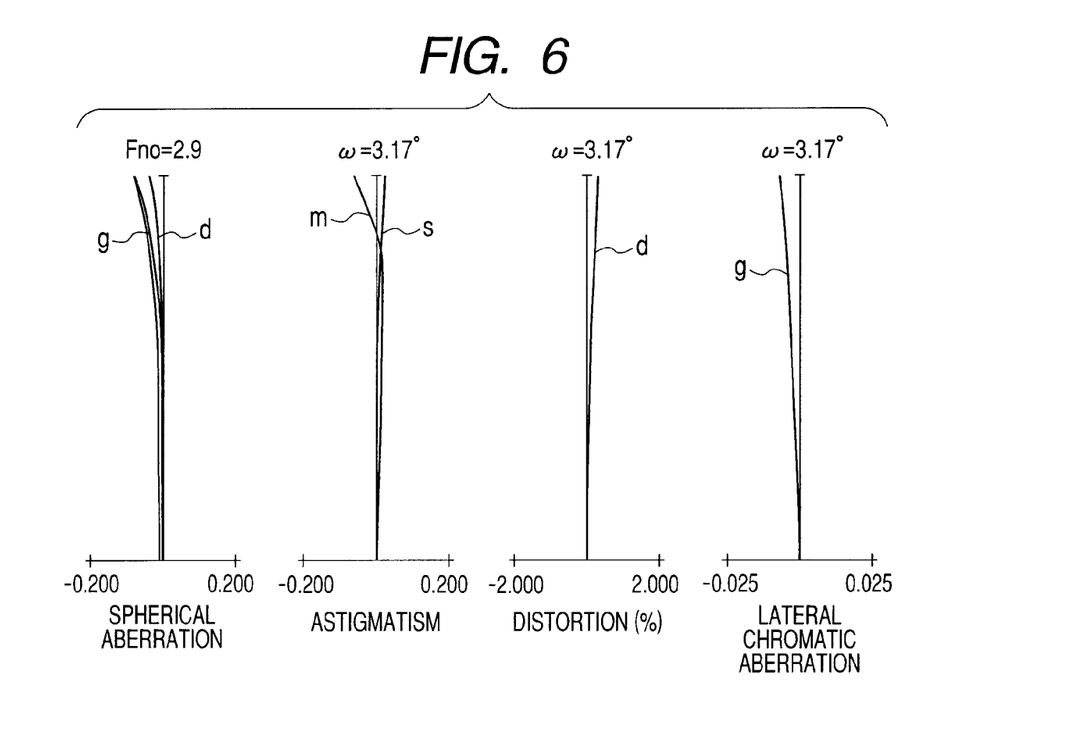
FIG. 6 is a diagram illustrating various aberrations when focused at infinity according to Numerical Embodiment 3 of the present invention.
Figure 7:
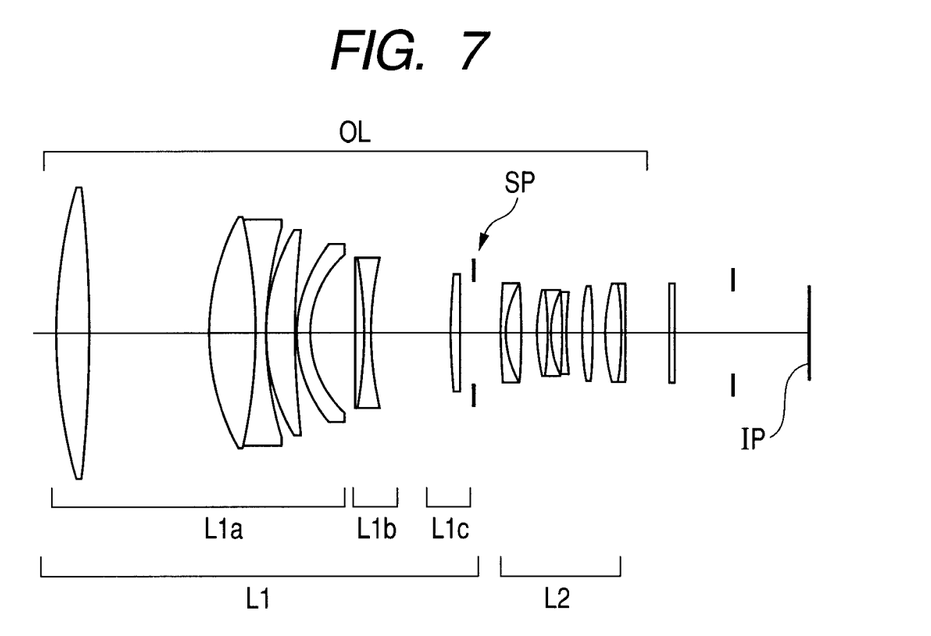
FIG. 7 is a lens cross section of an optical system according to Numerical Embodiment 4 of the present invention
Figure 8:
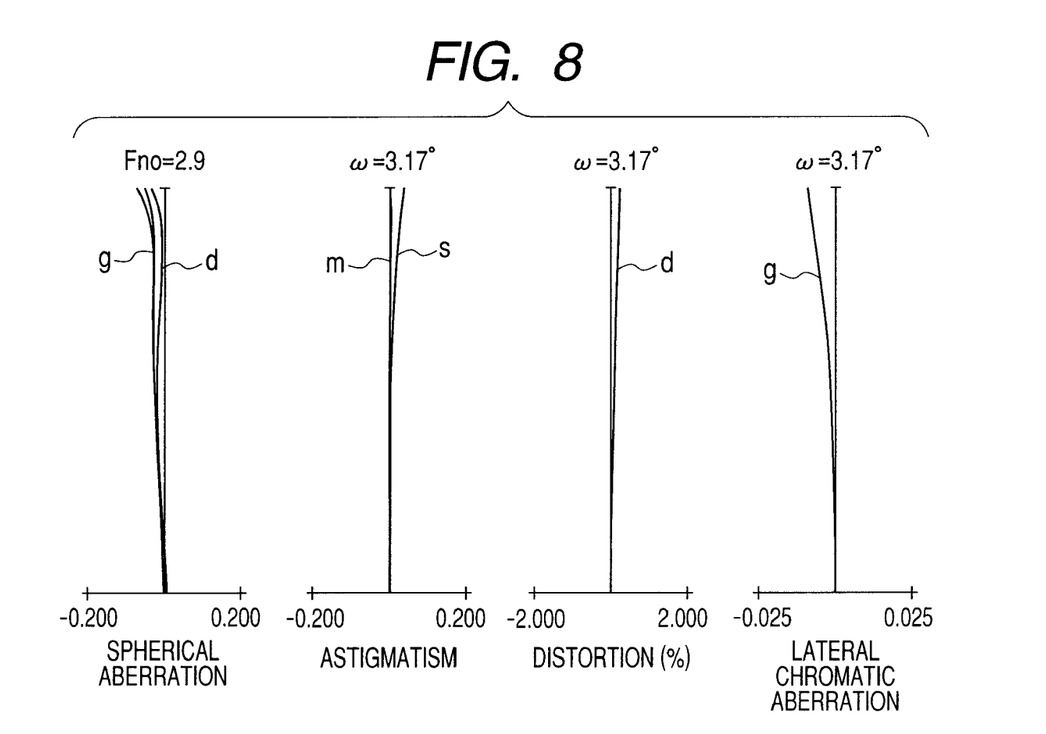
FIG. 8 is a diagram illustrating various aberrations when focused at infinity according to Numerical Embodiment 4 of the present invention.
Figure 9:
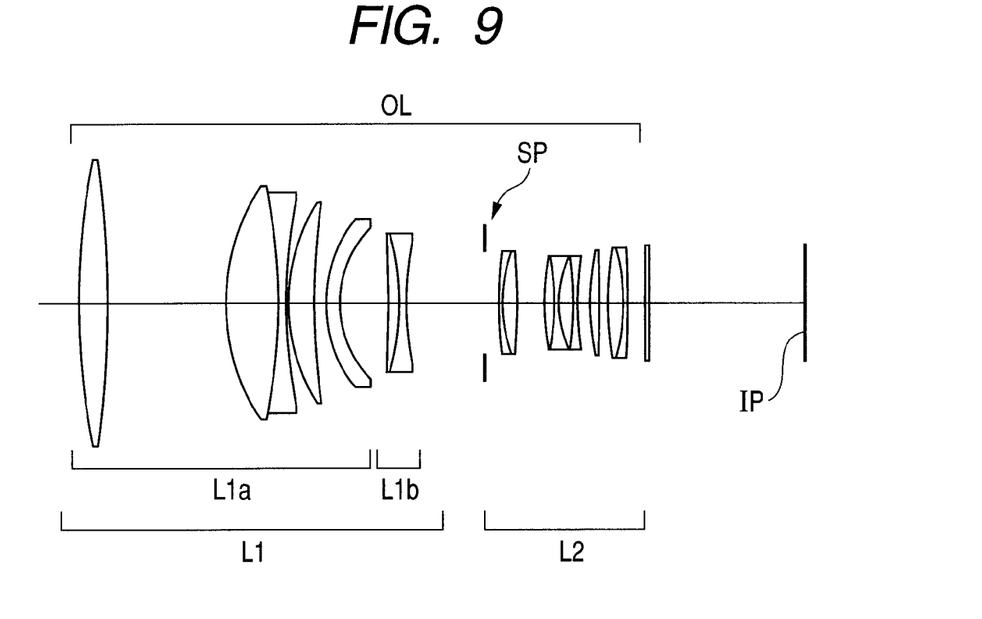
FIG. 9 is a lens cross section of an optical system according to Numerical Embodiment 5 of the present invention.
Figure 10:
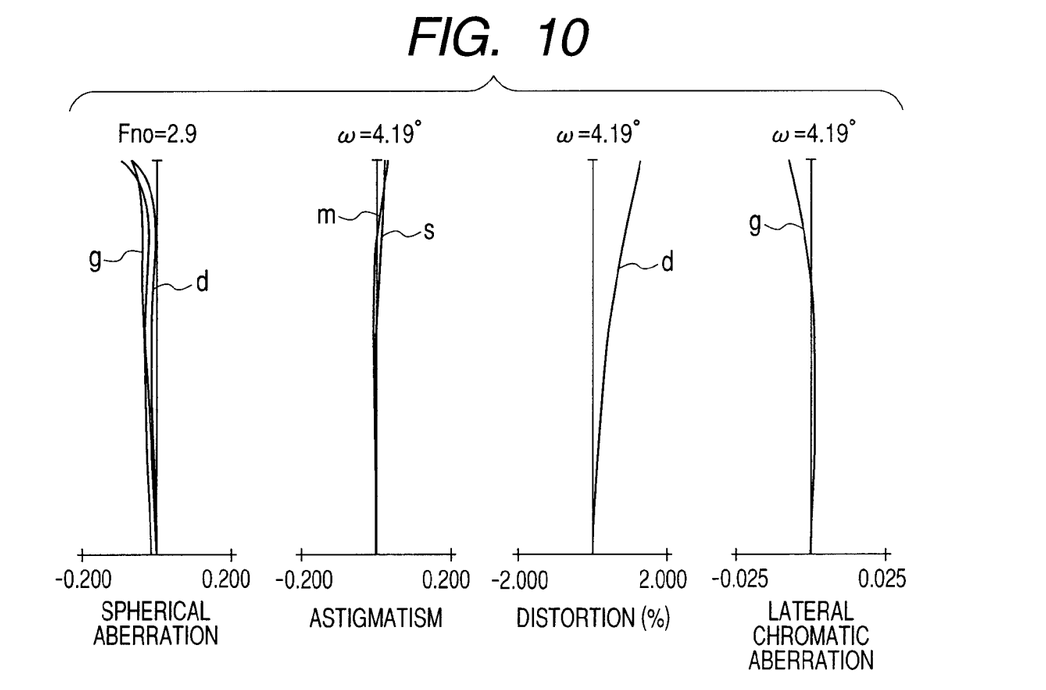
FIG. 10 is a diagram illustrating various aberrations when focused at infinity according to Numerical Embodiment 5 of the present invention.
Figure 11:
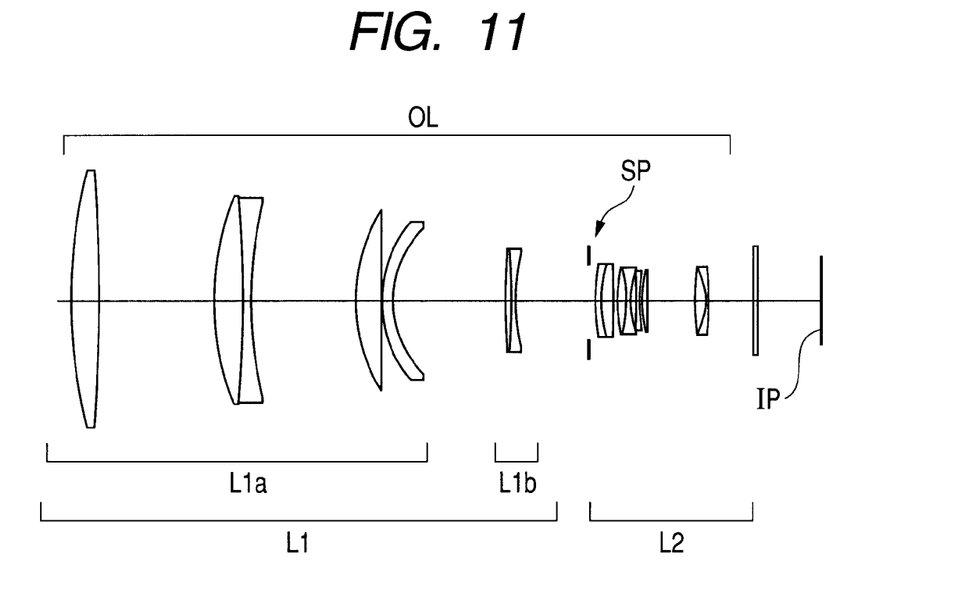
FIG. 11 is a lens cross section of an optical system according to Numerical Embodiment 6 of the present invention.
Figure 12:
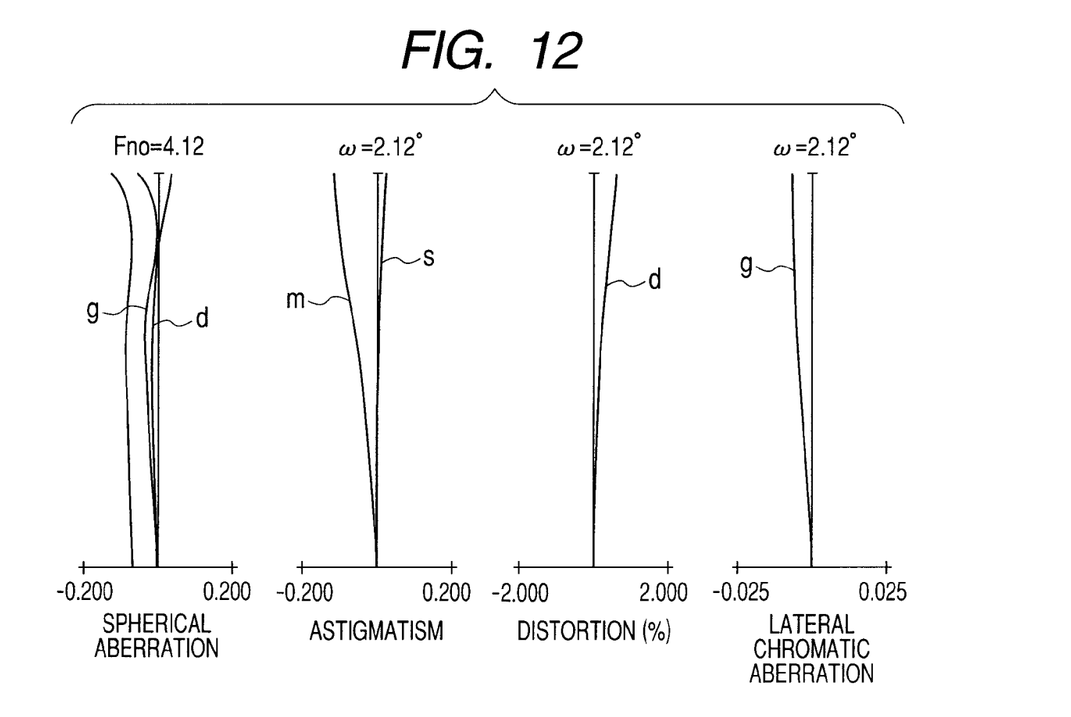
FIG. 12 is a diagram illustrating various aberrations when focused at infinity according to Numerical Embodiment 6 of the present invention.
Figure 13:
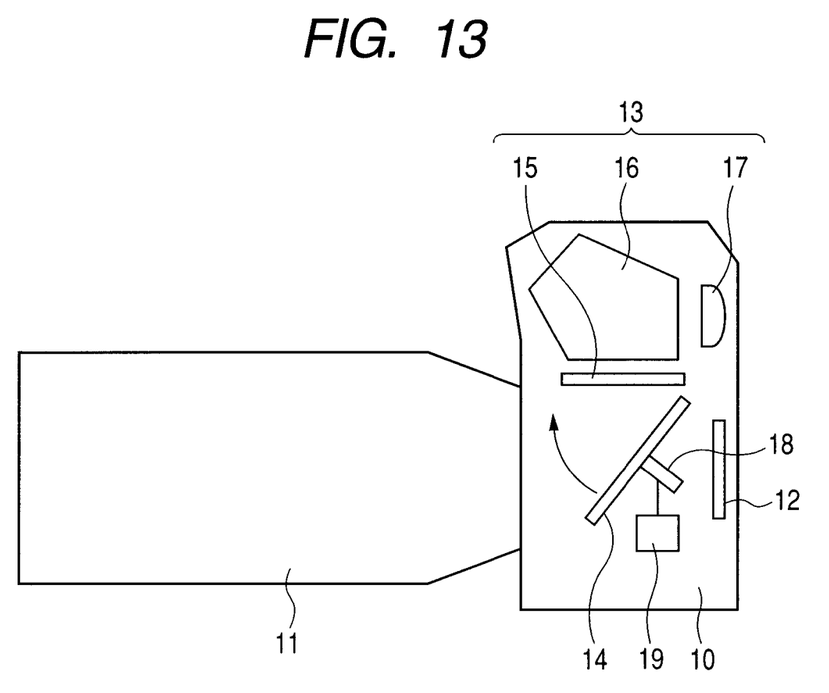
FIG. 13 is a schematic diagram of a main part of an optical device (image taking apparatus) according to the present invention.

Next, each embodiment of the present invention is described. FIG. 1 is a lens cross section of Embodiment 1 of the optical system according to the present invention. FIG. 2 is a diagram illustrating various aberrations when an object at infinity is focused in the optical system of Embodiment 1. FIG. 3 is a lens cross section of Embodiment 2 of the optical system according to the present invention. FIG. 4 is a diagram illustrating various aberrations when an object at infinity is focused in the optical system of Embodiment 2. FIG. 5 is a lens cross section of Embodiment 3 of the optical system according to the present invention. FIG. 6 is a diagram illustrating various aberrations when an object at infinity is focused in the optical system of Embodiment 3. FIG. 7 is a lens cross section of Embodiment 4 of the optical system according to the present invention. FIG. 8 is a diagram illustrating various aberrations when an object at infinity is focused in the optical system of Embodiment 4. FIG. 9 is a lens cross section of Embodiment 5 of the optical system according to the present invention. FIG. 10 is a diagram illustrating various aberrations when an object at infinity is focused in the optical system of Embodiment 5. FIG. 11 is a lens cross section of Embodiment 6 of the optical system according to the present invention. FIG. 12 is a diagram illustrating various aberrations when an object at infinity is focused in the optical system of Embodiment 6. FIG. 13 is a schematic diagram of a main part of an optical device according to the present invention.

The optical system of each embodiment is formed of a telephoto type. In the lens cross section, the left side is the object side (front) while the right side is the image side (rear). The optical system OL includes the first lens unit L1 having a positive refractive power, an Fno stop (aperture stop) SP for regulating a light flux of open number, and the second lens unit L2. The first lens unit L1 includes the first-a lens unit L1a of a positive refractive power, the first-b lens unit L1b having a negative refractive power, and further the first-c lens unit L1c having a positive refractive power depending on the embodiment.

An image surface IP corresponds to an imaging surface of a solid-state image pickup element (photoelectric conversion element) such as a CCD sensor or a CMOS sensor when the optical system is used as an imaging optical system such as a video camera or a digital still camera, while the image surface IP corresponds to a film surface when the optical system is used for a silver halide film camera. In each aberration diagram, d and g denote a d-line and a g-line, respectively, while m and s denote a meridional image surface and a sagittal image surface, respectively. Lateral chromatic aberration is expressed by the g-line.

A feature of the optical system OL in each embodiment is as follows. In each embodiment, the first-b lens unit L1b having a negative refractive power includes at least one of a negative lens and a positive lens $1bp$. When $\theta gF1$ denotes a partial dispersion ratio of a material of the positive lens $1bp$, and $vd1$ denotes Abbe number, the following conditional expression is satisfied.

$$0.020 < \theta gF1 - 0.6438 + 0.001682 \times vd1 < 0.100 \quad (1)$$

Note that a partial dispersion ratio and Abbe number of a material of the optical system in this embodiment is as follows. Ng, NF, Nd, and NC respectively denote refractive indexes with respect to the g-line (wavelength 435.8 nm), the F-line (wavelength 486.1 nm), the d-line (wavelength 587.6 nm), and the C-line (wavelength 656.3 nm) as Fraunhofer lines. The Abbe number vd and the partial dispersion ratio $\theta gF$ concerning the g-line and the F-line are as follows.

$$vd = (Nd-1)/(NF-NC)$$

$$\theta gF = (Ng-NF)/(NF-NC)$$

The conditional expression (1) defines a condition that a glass material having an anomalous dispersion property of the g-line (435.8 nm) that is high in a positive direction is used for the positive lens $1bp$ in the first-b lens unit L1b. In a telephoto lens system, longitudinal chromatic aberration and lateral chromatic aberration may be alleviated by using a glass material having an anomalous dispersion property that is high in a positive direction for a lens on the object side with respect to the aperture stop. Further, when a share of chromatic aberration in the first-a lens unit L1a is reduced, the power of the positive lens 1bp in the first lens unit L1 decreases, which allows a lightweight and compact system to be achieved. If the upper limit value in the conditional expression (1) is exceeded, chromatic aberration is corrected excessively.

On the other hand, if the lower limit value is fallen short of, the correction effect of the chromatic aberration correction is reduced. More preferably, the numerical value range in the conditional expression (1) may be set as follows.

$$0.020 < \theta gF1 - 0.6438 + 0.001682 \times vd1 < 0.040 \quad (1a)$$

In addition, in each embodiment, it is preferred that the Abbe number vd1 of a material of the positive lens 1bp satisfying the conditional expression (1) satisfies the following conditional expression.

$$vd1 < 23 \quad (2)$$

The conditional expression (2) defines a condition that a high dispersion material having a small Abbe number may preferably be used for the positive lens 1bp in the first-b lens unit L1b. Because the first-b lens unit L1b is a negative lens unit, a high dispersion material may preferably be used for the positive lens 1bp in view of achromatization in the lens unit. If the upper limit value in the conditional expression (2) is exceeded, it is difficult to attain achromatization in the lens unit, with the result that chromatic aberration fluctuation increases in focusing. More preferably, the numerical value range in the conditional expression (2) may be set as follows.

$$18 < vd1 < 23 \quad (2a)$$

Further, in each embodiment, the first-a lens unit L1a of a positive refractive power has at least one positive lens 1ap satisfying the following conditional expressions.

$$vd2 > 70 \quad (3)$$

$$0.020 < \theta gF2 - 0.6438 + 0.001682 \times vd2 \quad (4)$$

Here, θgF2 denotes a partial dispersion ratio of a material of the positive lens 1ap, and vd2 denotes Abbe number.

The conditional expressions (3) and (4) define a condition that a low dispersion glass material having a high anomalous dispersion property is used for at least one positive lens 1ap in the first-a lens unit L1a. Because the first-a lens unit L1a is a lens unit having a positive refractive power, longitudinal chromatic aberration and lateral chromatic aberration can be alleviated by using a low dispersion glass material having a high anomalous dispersion property for the positive lens 1ap.

More preferably, a glass material such as fluorite satisfying the following conditional expressions (3a) and (4a) may be used, so that an ability of alleviating chromatic aberration is increased.

$$vd2 > 90 \quad (3a)$$

$$0.040 < \theta gF2 - 0.6438 + 0.001682 \times vd2 \quad (4a)$$

In addition, in each embodiment, the first-b lens unit L1b having a negative refractive power may preferably include at least one negative lens which is mainly made of niobium (Nb) or lanthanum (La).

In addition, in each embodiment, the negative lens 1n disposed closest to the object side among the negative lenses included in the first lens unit L1 having a positive refractive power may preferably satisfy the following conditional expression.

$$2.40 < SGn1 < 4.75 \quad (5)$$

Here, SGn1 denotes a ratio of a mass of a glass material used for the negative lens 1n disposed closest to the object side under a pressure of 101.325 kPa (standard air pressure) at room temperature to a mass of pure water of the same volume under a pressure of 101.325 kPa (standard air pressure) at 4 degrees centigrade.

The conditional expression (5) defines a condition concerning a specific gravity of a material of the negative lens 1n disposed closest to the object side in the first lens unit L1. As the focal length increases, a ratio of the weight of the negative lens 1n disposed closest to the object side to the weight of the optical system is apt to increase. If the upper limit value in the conditional expression (5) is exceeded, the specific gravity increases, which makes it difficult to realize weight reduction.

More preferably, the numerical value range in the conditional expression (5) may be set as follows.

$$2.80 < SGn1 < 4.50 \quad (5a)$$

In addition, in each embodiment, the negative lens 1n disposed closest to the object side may preferably satisfy the following conditional expression.

$$\theta gF3 - 0.6438 + 0.001682 \times vd3 < 0 \quad (6)$$

Here, θgF3 denotes a partial dispersion ratio of a material of the negative lens 1n, and vd3 denotes Abbe number.

The conditional expression (6) defines a condition that a glass material having an anomalous dispersion property of the g-line (435.8 nm) that is high in a negative direction is used for the negative lens 1n disposed closest to the object side in the first lens unit L1. In general, in view of secondary achromatization, the effect becomes larger as a θgF difference is larger between a glass material used for a positive lens and a glass material used for a negative lens.

More preferably, the numerical value range in the conditional expression (6) may be set as follows.

$$-0.015 < \theta gF3 - 0.6438 + 0.001682 \times vd3 < -0.002 \quad (6a)$$

In addition, in each embodiment, when fG1 denotes a focal length of a lens G1 disposed closest to the object side, and d2 denotes an air gap between the lens G1 disposed closest to the object side and a neighboring lens on the image side, the following conditional expression may preferably be satisfied.

$$5 < fG1/d2 < 20 \quad (7)$$

The conditional expression (7) defines a condition concerning a focal length of the lens G1 disposed closest to the object side and an air gap to a lens (referred to as lens G2) neighboring to the lens G1 disposed closest to the object side. If the upper limit value of the conditional expression (7) is exceeded, an effective diameter of the lens G2 increases, which makes it difficult to realize weight reduction. On the other hand, if the lower limit value in the conditional expression (7) is fallen short of, an ability of correcting various aberrations of the lens G2 (in particular, longitudinal chromatic aberration and spherical aberration) is weakened, which leads to performance deterioration.

More preferably, the numerical value range in the conditional expression (7) may be set as follows.

$$6 < fG1/d2 < 14 \quad (7a)$$

Next, a feature of each embodiment is described. In Embodiments 1 to 3, 5, and 6, the optical system OL consists of, in order from the object side, the first lens unit L1 having a positive refractive power, the aperture stop SP, and the second lens unit L2 having a positive refractive power. The positive first lens unit L1 consists of, in order from the object side, the positive first-a lens unit L1a, and the negative first-b lens unit L1b. In addition, in Embodiment 4, the optical system OL consists of, in order from the object side, the first lens unit L1 having a positive refractive power, the aperture stop SP, and the second lens unit L2 having a positive refractive power. The positive first lens unit L1 consists of, in order from the object side, the positive first-a lens unit L1a, the negative first-b lens unit L1b, and the positive first-c lens unit L1c.

In addition, in each embodiment, focusing from an object at infinity to an object at a close distance is performed by moving the first-b lens unit L1b having a negative refractive power to the image side along the optical axis. In addition, correction of blur of a taken image due to a shake of the optical system is performed by moving at least some of the lenses in the second lens unit L2 to have a component in a direction perpendicular to the optical axis. Thus, a shake prevention effect is obtained.

Embodiment 1

In the optical system OL of Embodiment 1 illustrated in FIG. 1, the first-a lens unit L1a consists of, in order from the object side, a first positive lens, a second positive lens, a third negative lens, a fourth positive lens, and a fifth lens having a convex surface on the object side. The first-b lens unit L1b consists of a cemented lens of a sixth positive lens and a seventh negative lens in this order from the object side. The second lens unit L2 consists of, in order from the object side, a cemented lens of an eighth negative lens and a ninth positive lens, a cemented lens of a tenth positive lens and an eleventh negative lens, and a cemented lens of a twelfth negative lens, a thirteenth positive lens, a fourteenth positive lens, and a fifteenth negative lens.

The sixth positive lens corresponds to a positive lens 1bp. The second positive lens and the fourth positive lens correspond to the positive lens 1ap. The third negative lens corresponds to the negative lens 1n.

Embodiment 2

In the optical system OL of Embodiment 2 illustrated in FIG. 3, the first-a lens unit L1a and the first-b lens unit L1b are the same as those in Embodiment 1. The second lens unit L2 consists of, in order from the object side, a cemented lens of an eighth positive lens and a ninth negative lens, a cemented lens of a tenth positive lens and an eleventh negative lens, and a cemented lens of a twelfth negative lens, a thirteenth positive lens, a fourteenth positive lens, and a fifteenth negative lens.

Embodiment 3

In the optical system OL of Embodiment 3 illustrated in FIG. 5, the first-a lens unit L1a is the same as that in Embodiment 1. The first-b lens unit L1b consists of a cemented lens of a sixth negative lens, a seventh positive lens, and an eighth negative lens in this order from the object side. The second lens unit L2 is the same as that in Embodiment 1.

Embodiment 4

In the optical system OL of Embodiment 4 illustrated in FIG. 7, the first-a lens unit L1a and the first-b lens unit L1b are the same as those in Embodiment 1. The first-c lens unit L1c consists of an eighth positive lens. The second lens unit L2 is the same as that in Embodiment 1.

Embodiment 5

The optical system OL of Embodiment 5 illustrated in FIG. 9 is the same as that in Embodiment 1.

Embodiment 6

The optical system OL of Embodiment 6 illustrated in FIG. 11 is the same as that in Embodiment 1.

Numerical Embodiments

Hereinafter, concerning Numerical Embodiments 1 to 6 corresponding to Embodiments 1 to 6, specific numerical data are shown. In each Numerical Embodiment, i denotes an order from the object side. Symbol ri denotes a curvature radius of the i-th optical surface, di denotes an on-axis distance between the i-th surface and the (i+1)th surface, ndi and vdi respectively denote the refractive index and the Abbe number of a medium between the i-th and the (i+1)th surfaces with respect to the d-line. BF denotes back focus. Two final optical surfaces in each Numerical Embodiment correspond to a glass block such as a face plate, a filter, or the like. In addition, a relationship among the conditional expressions (5) and (7) and various numerical values in each Numerical Embodiment is shown in Table 1.

Numerical Embodiment 1

| Unit: mm | | | | |
|---|---|---|---|---|
| Surface data | | | | |
| i | ri | di | ndi | vdi |
| 1 | 251.287 | 16.40 | 1.48749 | 70.4 |
| 2 | −569.439 | 47.74 | | |
| 3 | 134.398 | 21.28 | 1.43387 | 95.1 |
| 4 | −239.479 | 0.24 | | |
| 5 | −237.555 | 4.00 | 1.61340 | 44.3 |
| 6 | 178.770 | 17.18 | | |
| 7 | 76.688 | 14.20 | 1.43387 | 95.1 |
| 8 | 318.525 | 1.03 | | |
| 9 | 60.263 | 6.00 | 1.51633 | 64.1 |
| 10 | 47.352 | 22.04 | | |
| 11 | −1630.821 | 4.00 | 1.92286 | 18.9 |
| 12 | −301.810 | 3.20 | 1.65412 | 39.7 |
| 13 | 149.471 | 45.57 | | |
| 14 (Stop) | ∞ | 8.36 | | |
| 15 | 327.772 | 2.18 | 1.72047 | 34.7 |
| 16 | 40.638 | 10.87 | 1.72916 | 54.7 |
| 17 | −927.465 | 10.02 | | |
| 18 | 103.249 | 5.93 | 1.84666 | 23.8 |
| 19 | −133.810 | 1.71 | 1.71300 | 53.9 |
| 20 | 45.777 | 5.62 | | |
| 21 | −155.221 | 1.67 | 1.88300 | 40.8 |
| 22 | 121.068 | 6.32 | | |
| 23 | 137.098 | 3.35 | 1.74950 | 35.3 |
| 24 | −256.865 | 5.53 | | |
| 25 | 85.030 | 7.34 | 1.65412 | 39.7 |
| 26 | −133.787 | 2.00 | 1.92286 | 18.9 |
| 27 | −3193.452 | 21.53 | | |

-continued

Unit: mm

| i | ri | di | ndi | vdi |
|---|---|---|---|---|
| 28 | ∞ | 2.20 | 1.51633 | 64.1 |
| 29 | ∞ | | | |

Various data

| | |
|---|---|
| Focal Distance | 390.06 |
| F number | 2.90 |
| Field angle | 3.17 |
| Image height | 21.64 |
| Total lens length | 365.05 |
| BF | 67.53 |

Numerical Embodiment 2

Unit: mm

Surface data

| i | ri | di | ndi | vdi |
|---|---|---|---|---|
| 1 | 270.270 | 14.50 | 1.48749 | 70.4 |
| 2 | −835.232 | 31.14 | | |
| 3 | 138.907 | 20.35 | 1.43387 | 95.1 |
| 4 | −523.327 | 0.19 | | |
| 5 | −499.366 | 4.30 | 1.72047 | 34.7 |
| 6 | 310.896 | 27.04 | | |
| 7 | 96.687 | 14.92 | 1.43387 | 95.1 |
| 8 | 664.543 | 0.24 | | |
| 9 | 63.598 | 6.00 | 1.51633 | 64.1 |
| 10 | 51.493 | 24.99 | | |
| 11 | 461.177 | 5.35 | 1.80809 | 22.8 |
| 12 | −178.181 | 3.20 | 1.83400 | 37.2 |
| 13 | 117.578 | 73.69 | | |
| 14 (Stop) | ∞ | 10.03 | | |
| 15 | 285.718 | 7.19 | 1.72916 | 54.7 |
| 16 | −69.727 | 2.18 | 1.84666 | 23.8 |
| 17 | −247.741 | 0.84 | | |
| 18 | 81.104 | 5.31 | 1.84666 | 23.8 |
| 19 | −151.144 | 2.00 | 1.69680 | 55.5 |
| 20 | 41.763 | 5.33 | | |
| 21 | −163.217 | 1.70 | 1.88300 | 40.8 |
| 22 | 95.192 | 2.18 | | |
| 23 | 93.284 | 5.74 | 1.83400 | 37.2 |
| 24 | −356.898 | 8.32 | | |
| 25 | 63.599 | 9.04 | 1.74950 | 35.3 |
| 26 | −95.263 | 1.87 | 1.80809 | 22.8 |
| 27 | 101.811 | 11.05 | | |
| 28 | ∞ | 2.20 | 1.48749 | 70.2 |
| 29 | ∞ | | | |

Various data

| | |
|---|---|
| Focal Distance | 390.09 |
| F number | 2.90 |
| Field angle | 3.17 |
| Image height | 21.64 |
| Total lens length | 367.66 |
| BF | 66.79 |

Numerical Embodiment 3

Unit: mm

Surface data

| i | ri | di | ndi | vdi |
|---|---|---|---|---|
| 1 | 231.110 | 17.35 | 1.48749 | 70.4 |
| 2 | −558.109 | 51.15 | | |
| 3 | 131.640 | 20.12 | 1.43387 | 95.1 |
| 4 | −260.094 | 0.22 | | |
| 5 | −254.979 | 4.00 | 1.65412 | 39.7 |
| 6 | 226.567 | 20.15 | | |
| 7 | 69.726 | 14.20 | 1.43387 | 95.1 |
| 8 | 210.857 | 1.03 | | |
| 9 | 65.119 | 6.00 | 1.51633 | 64.1 |
| 10 | 46.496 | 20.21 | | |
| 11 | −2436.427 | 2.00 | 1.84480 | 24.9 |
| 12 | 177.579 | 2.59 | | |
| 13 | 1091.298 | 4.00 | 1.92286 | 18.9 |
| 14 | −207.015 | 2.00 | 1.65412 | 39.7 |
| 15 | 393.677 | 43.82 | | |
| 16 (Stop) | ∞ | 10.26 | | |
| 17 | 325.034 | 2.18 | 1.74950 | 35.3 |
| 18 | 47.631 | 7.74 | 1.72916 | 54.7 |
| 19 | −282.501 | 5.87 | | |
| 20 | 88.239 | 5.26 | 1.84666 | 23.8 |
| 21 | −142.510 | 1.71 | 1.71300 | 53.9 |
| 22 | 46.340 | 5.01 | | |
| 23 | −193.013 | 1.67 | 1.88300 | 40.8 |
| 24 | 85.178 | 7.35 | | |
| 25 | 105.584 | 5.03 | 1.74950 | 35.3 |
| 26 | −315.066 | 4.43 | | |
| 27 | 73.759 | 6.73 | 1.65412 | 39.7 |
| 28 | −153.022 | 2.00 | 1.92286 | 18.9 |
| 29 | 351.555 | 18.75 | | |
| 30 | ∞ | 2.20 | 1.51633 | 64.1 |
| 31 | ∞ | | | |

Various data

| | |
|---|---|
| Focal Distance | 390.06 |
| F number | 2.90 |
| Field angle | 3.17 |
| Image height | 21.64 |
| Total lens length | 362.40 |
| BF | 67.37 |

Numerical Embodiment 4

Unit: mm

Surface data

| i | ri | di | ndi | vdi |
|---|---|---|---|---|
| 1 | 240.969 | 15.82 | 1.48749 | 70.4 |
| 2 | −761.554 | 58.13 | | |
| 3 | 115.449 | 21.98 | 1.43387 | 95.1 |
| 4 | −252.399 | 0.55 | | |
| 5 | −253.747 | 4.00 | 1.65412 | 39.7 |
| 6 | 173.095 | −0.44 | | |
| 7 | 91.251 | 14.20 | 1.56907 | 71.3 |
| 8 | 370.432 | 1.03 | | |
| 9 | 65.936 | 6.00 | 1.51633 | 64.1 |
| 10 | 50.274 | 21.94 | | |
| 11 | −1327.464 | 4.00 | 1.92286 | 18.9 |
| 12 | −214.560 | 3.20 | 1.72047 | 34.7 |
| 13 | 140.534 | 38.82 | | |
| 14 | 385.507 | 4.17 | 1.49700 | 81.5 |
| 15 | 1109.317 | 5.88 | | |
| 16 (Stop) | ∞ | 13.99 | | |
| 17 | 346.997 | 2.18 | 1.74950 | 35.3 |
| 18 | 41.228 | 7.87 | 1.72916 | 54.7 |
| 19 | ∞ | 493.145 | 7.58 | |
| 20 | 89.175 | 5.17 | 1.84666 | 23.8 |
| 21 | −178.339 | 1.69 | 1.71300 | 53.9 |
| 22 | 43.931 | 5.80 | | |
| 23 | −149.151 | 1.67 | 1.88300 | 40.8 |
| 24 | 115.045 | 7.31 | | |
| 25 | 115.843 | 5.14 | 1.74950 | 35.3 |

-continued

Unit: mm

| | | | | |
|---|---|---|---|---|
| 26 | −433.314 | 5.92 | | |
| 27 | 89.966 | 7.89 | 1.65412 | 39.7 |
| 28 | −144.994 | 2.00 | 1.92286 | 18.9 |
| 29 | −2212.083 | 20.71 | | |
| 30 | ∞ | 2.20 | 1.51633 | 64.1 |
| 31 | ∞ | | | |

Various data

| | |
|---|---|
| Focal Distance | 390.06 |
| F number | 2.90 |
| Field angle | 3.17 |
| Image height | 21.64 |
| Total lens length | 363.47 |
| BF | 67.09 |

Numerical Embodiment 5

Unit: mm

Surface data

| i | ri | di | ndi | νdi |
|---|---|---|---|---|
| 1 | 285.181 | 10.70 | 1.48749 | 70.2 |
| 2 | −365.280 | 45.00 | | |
| 3 | 77.200 | 19.00 | 1.43387 | 95.1 |
| 4 | −201.628 | 0.12 | | |
| 5 | −211.919 | 3.10 | 1.65412 | 39.7 |
| 6 | 185.490 | 0.74 | | |
| 7 | 68.270 | 9.50 | 1.43387 | 95.1 |
| 8 | 241.309 | 4.51 | | |
| 9 | 49.323 | 5.00 | 1.51633 | 64.1 |
| 10 | 36.974 | 18.45 | | |
| 11 | −366.928 | 4.05 | 1.92286 | 18.9 |
| 12 | −98.774 | 2.40 | 1.74950 | 35.3 |
| 13 | 101.913 | 29.58 | | |
| 14 (Stop) | ∞ | 5.56 | | |
| 15 | 153.525 | 1.33 | 1.84666 | 23.8 |
| 16 | 52.297 | 5.67 | 1.65160 | 58.5 |
| 17 | −178.690 | 10.22 | | |
| 18 | 80.489 | 3.59 | 1.84666 | 23.8 |
| 19 | −117.581 | 1.80 | 1.72916 | 54.7 |
| 20 | 38.409 | 5.45 | | |
| 21 | −114.990 | 1.70 | 1.83400 | 37.2 |
| 22 | 105.792 | 4.62 | | |
| 23 | 83.144 | 3.75 | 1.80518 | 25.4 |
| 24 | −362.882 | 3.23 | | |
| 25 | 118.635 | 5.83 | 1.74950 | 35.3 |
| 26 | −68.316 | 1.61 | 1.92286 | 18.9 |
| 27 | −658.596 | 6.39 | | |
| 28 | ∞ | 2.00 | 1.51633 | 64.1 |
| 29 | ∞ | | | |

Various data

| | |
|---|---|
| Focal Distance | 294.99 |
| F number | 2.90 |
| Field angle | 4.19 |
| Image height | 21.64 |
| Total lens length | 274.25 |
| BF | 59.36 |

Numerical Embodiment 6

Unit: mm

Surface data

| i | ri | di | ndi | νdi |
|---|---|---|---|---|
| 1 | 286.629 | 16.20 | 1.48749 | 70.2 |
| 2 | −880.980 | 65.94 | | |
| 3 | 161.292 | 15.80 | 1.43387 | 95.1 |
| 4 | −824.201 | 1.11 | | |
| 5 | −528.597 | 4.00 | 1.74950 | 35.3 |
| 6 | 235.619 | 59.99 | | |
| 7 | 100.762 | 13.80 | 1.43387 | 95.1 |
| 8 | 2169.151 | 0.91 | | |
| 9 | 72.216 | 6.00 | 1.51633 | 64.1 |
| 10 | 58.679 | 64.97 | | |
| 11 | 684.025 | 3.00 | 1.92286 | 18.9 |
| 12 | −443.346 | 2.70 | 1.74950 | 35.3 |
| 13 | 127.036 | 41.45 | | |
| 14 (Stop) | ∞ | 4.40 | | |
| 15 | 130.503 | 3.76 | 1.80610 | 33.3 |
| 16 | 75.938 | 6.53 | 1.60311 | 60.6 |
| 17 | −599.947 | 2.52 | | |
| 18 | 70.907 | 4.88 | 1.84666 | 23.8 |
| 19 | −121.453 | 2.68 | 1.72916 | 54.7 |
| 20 | 44.211 | 3.54 | | |
| 21 | −102.891 | 1.50 | 1.80400 | 46.6 |
| 22 | 105.801 | 1.98 | | |
| 23 | 71.196 | 2.88 | 1.78472 | 25.7 |
| 24 | 413.138 | 28.03 | | |
| 25 | 247.878 | 5.79 | 1.74950 | 35.3 |
| 26 | −39.660 | 1.80 | 1.92286 | 18.9 |
| 27 | −257.888 | 26.16 | | |
| 28 | ∞ | 2.63 | 1.51633 | 64.1 |
| 29 | ∞ | | | |

Various data

| | |
|---|---|
| Focal Distance | 585.79 |
| F number | 4.12 |
| Field angle | 2.12 |
| Image height | 21.64 |
| Total lens length | 471.39 |
| BF | 76.44 |

TABLE 19

| | Conditional Expression (1) | Conditional Expression (7) |
|---|---|---|
| Embodiment 1 | 2.93 | 7.54 |
| Embodiment 2 | 3.19 | 13.51 |
| Embodiment 3 | 2.93 | 6.60 |
| Embodiment 4 | 2.93 | 6.49 |
| Embodiment 5 | 2.93 | 7.34 |
| Embodiment 6 | 3.29 | 6.76 |

Next, an embodiment of a single-lens reflex camera system using the optical system OL according to the present invention is explained with reference to FIG. 13.

In FIG. 13, the camera system includes a single-lens reflex camera main body 10, and an interchangeable lens 11 equipped with an optical system of the present invention. A recording unit 12 includes a film, an image pickup element, or the like for recording a subject image obtained through the interchangeable lens 11, and a finder optical system 13 is used for observing a subject image from the interchangeable lens 11. A quick return mirror 14 switches and transmits the subject image to be received from the interchangeable lens 11, between the record unit 12 and the finder optical system 13.

When the subject image is observed by the finder optical system 13, the subject image is formed on a focus plate 15 through the quick return mirror 14. Then, a pentaprism 16 converts the subject image into an erect image, which is observed by being magnified by an eyepiece optical system 17. When taking an image, the quick return mirror 14 turns in an arrow direction, so that the subject image is formed on the record unit 12 and is recorded therein. The camera system further includes a sub mirror 18 and a focus detection device 19.

In this way, the imaging optical system of the present invention is applied to an image taking apparatus such as an interchangeable lens of a single-lens reflex camera or the like, to thereby realize an image taking apparatus of high optical performance. Note that the present invention may also be applied to a single-lens reflex camera without a quick return mirror in the same manner.

The preferred embodiments of the present invention are described above, but the present invention is not limited to the embodiments, and may be modified and changed variously within the scope of the spirit thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-231315, filed Oct. 5, 2009, which is hereby incorporated by reference herein in its entirety.

What is claimed is:

1. An optical system comprising: in order from an object side to an image side,
   a first lens unit having a positive refractive power;
   an aperture stop; and
   a second lens unit,
   wherein the first lens unit includes:
      a first-a lens unit having a positive refractive power; and
      a first-b lens unit having a negative refractive power which moves along an optical axis in focusing,
   wherein the first-b lens unit includes at least one negative lens and at least one positive lens $1bp$, and
   wherein the following conditional expression is satisfied:

$$0.020 < \theta gF1 - 0.6438 + 0.001682 \times vd1 < 0.100,$$

where $\theta gF1$ denotes a partial dispersion ratio of a material of the positive lens $1bp$ and $vd1$ denotes Abbe number of the positive lens $1bp$.

2. An optical system according to claim 1, wherein the Abbe number $vd1$ of a material of the positive lens $1bp$ satisfies the following conditional expression:

$$vd1 < 23.$$

3. An optical system according to claim 1,
   wherein the first-a lens unit includes at least one positive lens $1ap$, and
   wherein the following conditional expressions are satisfied:

$$vd2 > 70; \text{ and}$$

$$0.020 < \theta gF2 - 0.6438 + 0.001682 \times vd2,$$

where $\theta gF2$ denotes a partial dispersion ratio of a material of the positive lens $1ap$ and $vd2$ denotes Abbe number of the positive lens $1ap$.

4. An optical system according to claim 1, wherein the first-b lens unit includes at least one negative lens which is mainly made of one of niobium (Nb) and lanthanum (La).

5. An optical system according to claim 1, wherein the following conditional expression is satisfied:

$$2.40 < SGn1 < 4.75,$$

where $SGn1$ denotes a ratio of a mass of a glass material used for a negative lens $1n$ disposed closest to the object side under a pressure of 101.325 kPa (standard air pressure) at room temperature to a mass of pure water of the same volume under a pressure of 101.325 kPa (standard air pressure) at 4 degrees centigrade.

6. An optical system according to claim 5, wherein the following conditional expression is satisfied:

$$\theta gF3 - 0.6438 + 0.001682 \times vd3 < 0,$$

where $\theta gF3$ denotes a partial dispersion ratio of a material of the negative lens $1n$ and $vd3$ denotes Abbe number of the negative lens $1n$.

7. An optical system according to claim 1, wherein the following conditional expression is satisfied:

$$5 < fG1/d2 < 20,$$

where $fG1$ denotes a focal length of a lens G1 disposed closest to the object side and $d2$ denotes an air gap between the lens G1 and a lens neighboring the lens G1 in the optical system.

8. An optical device comprising the optical system according to claim 1.

* * * * *